United States Patent [19]
Toy

[11] Patent Number: 4,982,810
[45] Date of Patent: Jan. 8, 1991

[54] VEHICLE ANTI-THEFT DEVICE

[76] Inventor: Malcolm D. Toy, 425 Willow Pl., Pittsburgh, Pa. 15218

[21] Appl. No.: 378,695

[22] Filed: Jul. 12, 1989

[51] Int. Cl.⁵ ............................................. B60R 25/02
[52] U.S. Cl. ..................................... 180/287; 180/90; 296/70; 70/237; 70/245; 70/252
[58] Field of Search .................. 180/287, 90; 280/779; 70/237, 417, 252, 254, 207, 245, 247; 296/70

[56] References Cited

U.S. PATENT DOCUMENTS

| | | | |
|---|---|---|---|
| 1,193,679 | 8/1916 | Fox | 70/199 |
| 3,245,239 | 4/1966 | Zaidener | 70/237 |
| 4,304,111 | 12/1981 | Nolin | 70/212 |
| 4,442,688 | 4/1984 | Saegusa | 70/252 |
| 4,699,238 | 10/1987 | Tamir | 180/287 |
| 4,719,986 | 1/1988 | Richardson | 180/287 |

FOREIGN PATENT DOCUMENTS 928570  6/1946  France .
925217  8/1947  France .
1269513 6/1970  United Kingdom .

Primary Examiner—Richard A. Bertsch
Attorney, Agent, or Firm—Buchanan Ingersoll

[57] ABSTRACT

An anti-theft device for a motor vehicle is provided. The anti-theft device is built into the vehicle and recesses into the dashboard of the vehicle when not in use. When in use, the anti-theft device is pulled from the dashboard and contacts the steering wheel of the vehicle. A lock mechanism provides the ability to lock the anti-theft device in contact with the steering wheel to prevent movement of the steering wheel. The anti-theft device is a non-flexible member which is withdrawn from the vehicle dashboard and passes in proximity to the transmission selector lever of the vehicle so that the transmission selector lever may not be moved out of the park position. When not in use, the anti-theft device is retracted into the dashboard of the vehicle and locked in that position.

20 Claims, 2 Drawing Sheets

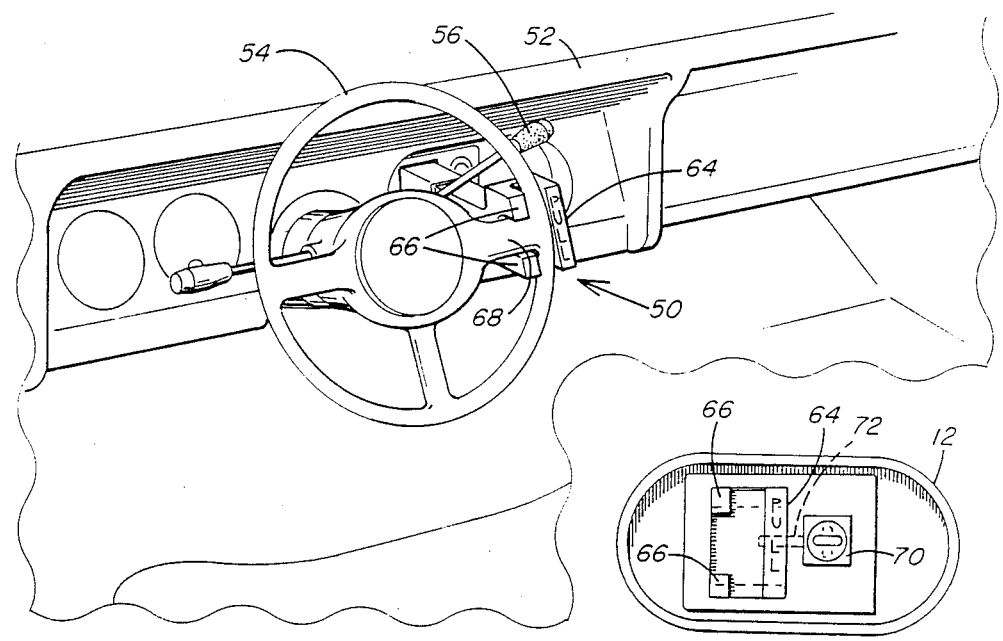
FIG. 7
FIG. 10
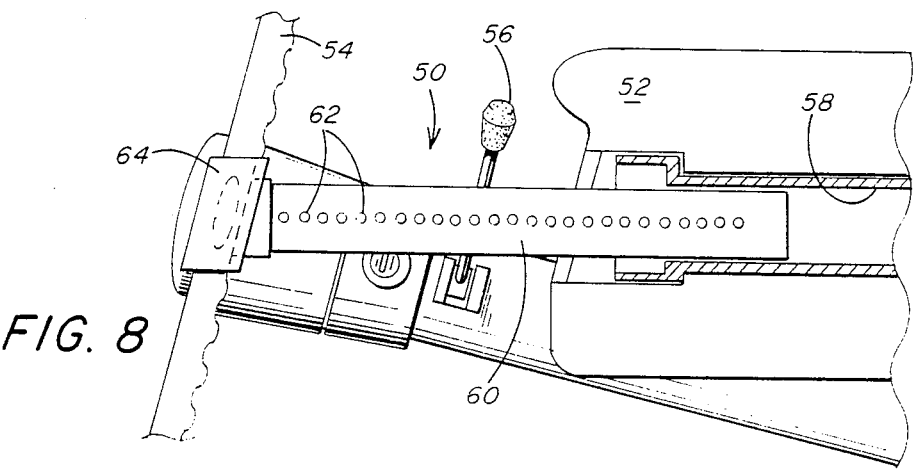
FIG. 8
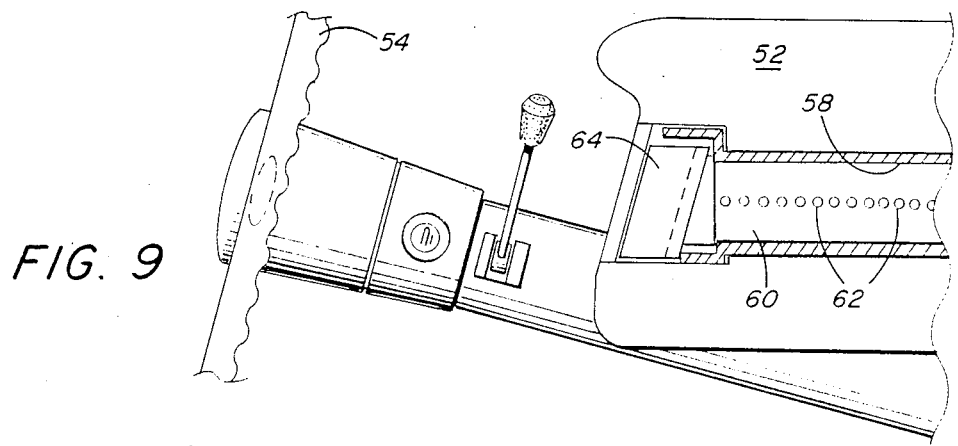
FIG. 9

VEHICLE ANTI-THEFT DEVICE

BACKGROUND OF THE INVENTION

1. Field Of the Invention

This invention relates to a device which deters the theft of motor vehicles by positively locking the steering wheel of the vehicle to the dashboard of the vehicle by means of a non-flexible bar that retracts into the vehicle dashboard when not in use.

2. Description of the Prior Art

Since the advent of the motor vehicle, various devices have been proposed to prevent the theft or unauthorized use of vehicles. Various types of ignition locks, steering wheel locks, and locks on other operating elements of the vehicle have been proposed and, in some cases, utilized. U.S. Pat. No. 1,193,679 shows an early attempt at providing a locking rod between the steering wheel and clutch pedal of a vehicle. U.S. Pat. Nos. 4,304,111, 4,442,688, and 4,699,238 all show various forms of steering wheel locks for motor vehicles. French Patent No. 925,217 shows a device for locking the gear selector lever of a motor vehicle and French Patent No. 928,570 shows a device for locking the steering wheel of a motor vehicle. British Patent No. 1,269,513 discloses a flexible and extendible unit which may be utilized to lock the steering wheel of a motor vehicle.

Although each of the foregoing disclosures have some merit in providing a vehicle anti-theft device, none of them provides a unit which is conveniently and compactly stored when not in use and, at the same time, is readily attached to a vehicle steering wheel to provide a theft deterrent unit for the vehicle.

SUMMARY OF THE INVENTION

In accordance with the present invention, there is provided an anti-theft device for a vehicle having a steering wheel and a dashboard. The anti-theft device has a locking bar moveable between an idle position where the locking bar is retracted into the dashboard of the vehicle when the anti-theft device is not in use and an active position where the locking bar is partially withdrawn from the dashboard when the anti-theft device is in use. The locking bar has a steering wheel contacting end portion that prevents rotation of the steering wheel when the wheel contacting end portion is in contact with the steering wheel. A lock maintains the locking bar end portion locked into contact with the steering wheel when the anti-theft device is in use.

Further, in accordance with the present invention, there is provided an anti-theft device for a vehicle having a steering wheel and a dashboard. A locking bar moveable between an idle position where the locking bar is retracted into the dashboard and an active position where the locking bar is partially withdrawn from the dashboard is provided. The locking bar is formed of a telescoping structural member with one end attached within the vehicle dashboard. A steering wheel lock is fixed to the free end of the locking bar structural member and has a hinged portion that opens to receive the steering wheel and locks into the closed position to secure the steering wheel to the locking bar structural member. The steering wheel lock has an additional locked position which permits the steering wheel lock to be locked into cooperating recesses in the dashboard when the locking bar is in the idle position to prevent withdrawal of the locking bar.

Still further in accordance with the present invention, an anti-theft device for a vehicle having a steering wheel and a dashboard is provided. The anti-theft device has a locking bar moveable between an idle position where the locking bar is retracted into the dashboard and an active position where the locking bar is partially withdrawn from the dashboard. The locking bar is formed from a single rigid structural member that has a plurality of spaced indentations formed along its length. A steering wheel receiving fork is fixed to the end of the locking bar to secure the steering wheel from movement relative to the locking bar when the receiving fork is in contact with the steering wheel. A lock is mounted on the dashboard and cooperates with the locking bar spaced indentations so that the locking bar can be selectively locked with the receiving fork in contact with the steering wheel or with the locking bar completely recessed within the dashboard.

Accordingly, the principal object of the present invention is to provide a motor vehicle anti-theft device which locks the steering wheel of the vehicle and which is readily stored in an inconspicuous place when not in use.

Another object of the present invention is to provide a vehicle anti-theft device which utilizes a non-flexible structural member to connect the dashboard of the vehicle and the steering wheel to prevent movement of the steering wheel.

A further object of the present invention is to provide a vehicle anti-theft device which is built into the vehicle and operates in addition to the standard ignition and steering wheel lock.

A still further object of the present invention is to provide a vehicle anti-theft device that prohibits the transmission selector lever from being moved into the drive position when the structural member is locked on the steering wheel, thus the vehicle cannot be started or moved.

These and other objects of the present invention will be more completely disclosed and described in the following specification, the accompanying drawings, and the appended claims.

BRIEF DESCRIPTION OF THE DRAWINGS

FIG. 7 is a perspective view similar to FIG. 1 showing a second embodiment of the anti-theft device.

FIG. 8 is a side elevation partially in section of the anti-theft device of FIG. 7.

FIG. 9 is the anti-theft device of FIG. 7 shown in the retracted position.

FIG. 10 is a partial elevational view showing the lock mechanism of the anti-theft device of FIG. 7.

DESCRIPTION OF THE PREFERRED EMBODIMENTS

Figure 1:
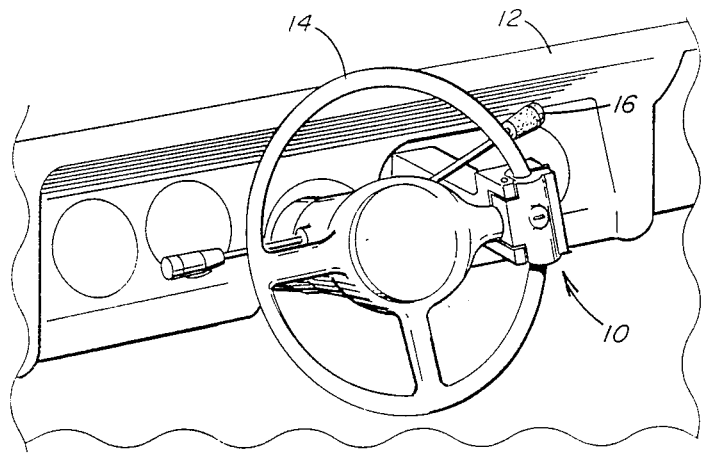
FIG. 1 is a perspective view of a vehicle steering wheel and dashboard with one embodiment of the anti-theft device installed on the vehicle.
Figure 3:
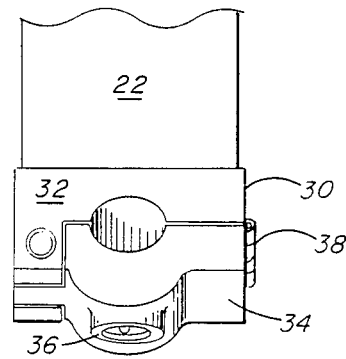
FIG. 3 is a top perspective view of the lock device of FIG. 1 shown in the locked position.
Figure 2:
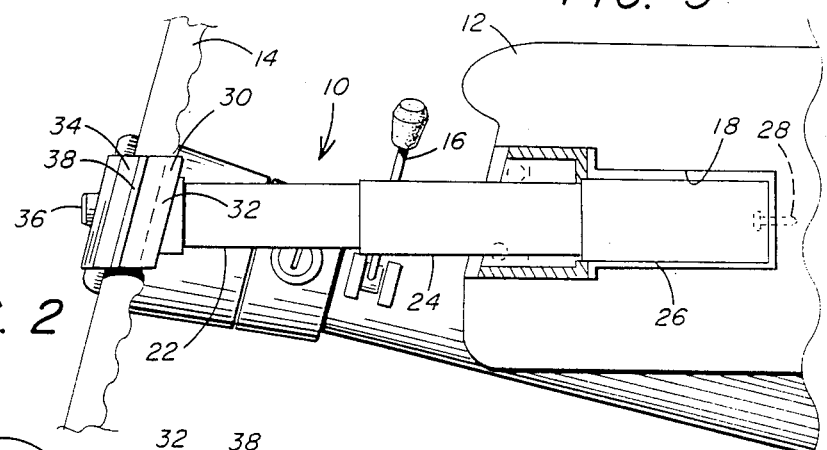
FIG. 2 is a side elevation partially in section showing the anti-theft device of FIG. 1.

Referring to the drawings, and particularly to FIGS. 1, 2 and 3, there is shown an anti-theft device indicated generally at 10 for a motor vehicle having a dashboard 12, a steering wheel 14, and a transmission selector lever 16. The steering wheel 14 and transmission selector lever 16 are conventional in all respects.

As best seen in FIG. 2, the dashboard 12 has a recess 18 formed therein to receive a locking bar 20 that is part of the anti-theft device 10 of the present invention. The locking bar 20 consists of telescoping sections 22, 24 and 26. The locking bar 20 is preferably of rectangular cross-section and the telescoping sections 22, 24 and 26 each have interlocking end portions so that when the locking bar is pulled to the extended position shown in FIG. 2 the telescoping sections 22, 24 and 26 cannot separate from each other. Telescoping section 26 is fastened to the vehicle by means of one or more fasteners 28.

The steering wheel contacting end of locking bar 20 has a steering wheel lock 30 form on it. The recess 18 within the dashboard is so positioned that when the locking bar 20 is withdrawn from the dashboard the steering wheel lock contacts the outer circumference of the steering wheel and the locking bar 20 passes in proximity to the transmission selector lever 16 when the transmission selector lever is in the parked position so that the locking bar 20 obstructs the movement of the transmission selector lever 16 and prevents it from being moved from the parked position.

Figure 4:
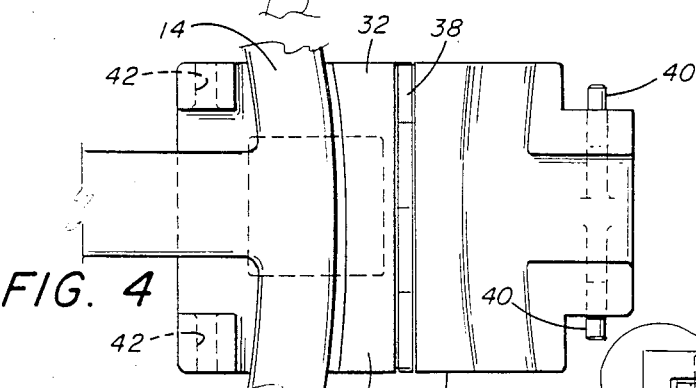
FIG. 4 is an elevational view of the lock mechanism of FIG. 1 shown in the open position.
Figure 5:
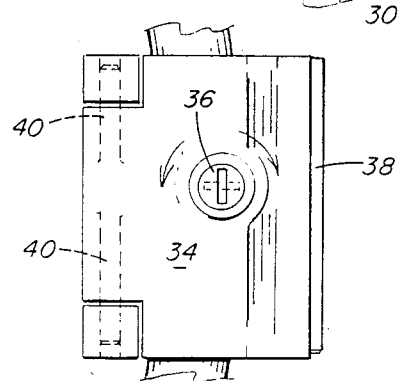
FIG. 5 is the lock mechanism of FIG. 1 shown in the locked position.

The steering wheel lock 30 has a base 32 and a cover 34 containing a key operated tumbler lock 36 which are joined together by hinge 38. As shown in FIG. 3, the steering wheel lock 30 is closed as it would be to lock the steering wheel. As shown in FIG. 4, the steering wheel lock 30 is unlocked and the cover 34 has been pivoted away from the steering wheel 14 to show the position of the lock when the steering wheel is initially contacted by the lock 30 and before the cover 34 is pivoted over the steering wheel 14 and locked.

The lock 36 is a conventional key operated tumbler lock although a combination lock could also be provided if desired. The lock 36 operates, in conventional fashion, bolts 40 that reciprocate within the cover 34. There are bolt receiving recesses 42 within the base 32 to receive bolts 40 and thereby lock the cover 34 to the base 30.

Figure 6:
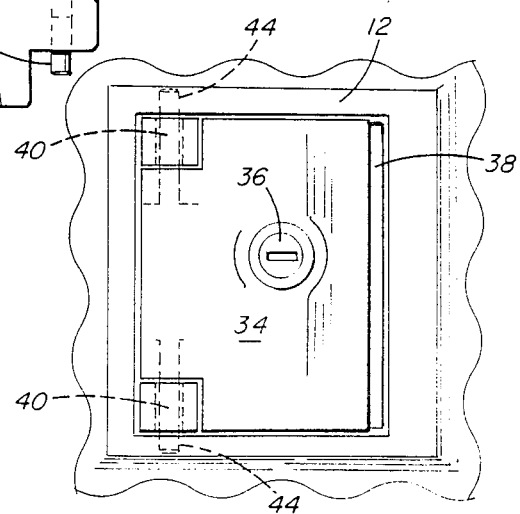
FIG. 6 is the lock mechanism of FIG. 1 shown as it is locked into the dashboard of the vehicle.

As shown in FIG. 6, the steering wheel lock 30 is recessed into the dashboard 12 by pushing the locking bar 20 inwardly so that the telescoping sections 22, 24 and 26 of locking bar 20 move into the dashboard recess 18. When so positioned, the anti-theft device 10 is not in operation and the lock 36 is operated to extend the bolts 40 beyond the edges of base 32 into recesses 44 formed within the dashboard 12. By extending the bolts 40 into the recesses 44, the entire anti-theft device 10 is locked within the dashboard recess 18.

Referring now to FIGS. 7 through 10, there is shown a second embodiment of the anti-theft device of the present invention indicated generally at 50 for a motor vehicle having a dashboard 52, a steering wheel 54, and a transmission selector lever 56. The steering wheel 54 and transmission selector lever 56 are conventional in all respects.

As best seen in FIGS. 8 and 9, the dashboard 52 has a recess 58 formed therein to receive a locking bar 60 that is part of the anti-theft device 50 of the present invention. The locking bar 60 consists of a rigid bar preferably being of rectangular cross-section. A series of indentations or holes 62 are formed in one side of the locking bar 60. The locking bar 60 may be formed as a hollow member with indentations 62 being holes that extend all the way through one wall of the hollow member.

Fixed to the end of locking bar 60 is a steering wheel receiving fork 64. The steering wheel receiving fork 64 is generally U-shaped and has two prongs 66 that extend on one side of the fork 64. As best seen in FIG. 7, the steering wheel receiving fork 64 contacts the steering wheel outer circumference and the prongs 66 straddle a spoke 68 on the steering wheel to prevent the steering wheel from being moved relative to the fork 64 while fork 64 is in contact with the steering wheel.

As seen FIG. 10, a key operated tumbler lock 70 is secured to dashboard 52 and, in conventional fashion, operates a bolt 72 that reciprocates within dashboard 52 depending upon the position of the key which operates the tumbler lock 70. The bolt 72 cooperates with the indentations 62 on locking bar 60 to fix the position of locking bar 60 relative to vehicle dashboard 52 and lock locking bar 60 in that position.

As shown in FIGS. 7 and 8, the anti-theft device 50 is in the actuated position with the steering wheel receiving fork 64 in contact with the steering wheel and preventing the steering wheel from being moved. In that position, the lock 70 forces bolt 72 into the appropriate indentations 62 within the locking bar 60 to prevent the fork 64 from being moved out of contact with the steering wheel. As in the case of the embodiment of FIGS. 1–6, the locking bar 60 passes in proximity to the transmission selector lever 56 when the selector lever 56 is in the park position so that the selector lever may not be moved out of the park position.

As seen in FIG. 9, the locking bar 60 is completely recessed into the vehicle dashboard 52 and the lock mechanism 70 cooperates with the appropriate recess 62 to prevent movement out of the dashboard by locking bar 60. When the anti-theft device 50 is in the recessed position shown in FIG. 9, the steering wheel receiving fork 64 is visible and may be utilized as a handle to pull the locking bar 60 outwardly from the recess 58 within the dashboard 52.

It will be appreciated that the embodiment of FIGS. 7 through 10 could also be constructed with ratchet teeth on the locking bar 60 that would permit bar 60 to be withdrawn from the dashboard to the proper position against the steering wheel and locked in that position by means of a lock which would prevent retraction of bar 60.

According to the provisions of the Patent Statutes, I have explained the principle, preferred construction, and mode of operation of my invention and have illustrated and described what I now consider to represent its best embodiments. However, it should be understood that, within the scope of the appended claims, the invention may be practiced otherwise than as specifically illustrated and described.

I claim:

1. An anti-theft device for a vehicle having a steering wheel and a dashboard comprising:
   a recess formed within said dashboard to completely receive a locking bar;
   a locking bar movable between an idle position wherein said locking bar is completely retracted into said dashboard recess when said anti-theft device is not in use and an active position wherein said locking bar is partially withdrawn from said dashboard when said anti-theft device is in use;

said locking bar having a steering wheel contacting end portion that prevents rotation of said steering wheel when said locking bar steering wheel contacting end portion is in contact with said steering wheel; and lock means associated with said locking bar to maintain said steering wheel contacting end portion locked into contact with said steering wheel when said anti-theft device is in use.

2. The anti-theft device of claim 1 wherein said locking bar comprises a telescoping structural member.

3. The anti-theft device of claim 1 wherein said locking bar comprises a rigid structural member having a plurality of spaced indentation formed along its length.

4. The anti-theft device of claim 3 wherein said lock means has a bolt slidingly secured to said dashboard that cooperates with said locking bar spaced indentations to lock the position of said locking bar relative to said dashboard.

5. The anti-theft device of claim 4 wherein said lock means locks said locking bar in the retracted position when said anti-theft device is not in use.

6. The anti-theft device of claim 5 wherein said lock means is formed with a key actuated tumbler lock.

7. The anti-theft device of claim 1 wherein said steering wheel contacting end portion has said lock means built into it.

8. The anti-theft device of claim 7 wherein said lock means cooperates with recesses formed in said dashboard to lock said locking bar in the retracted position when said anti-theft device is not in use.

9. The anti-theft device of claim 8 wherein said lock means is formed with a key actuated tumbler lock.

10. The anti-theft device of claim 1 wherein said locking bar is located in proximity to the transmission selector lever of said vehicle when said anti-theft device is in use whereby said locking bar blocks movement of said transmission lever to prevent it from being operated.

11. An anti-theft device for a vehicle having a steering wheel and a dashboard comprising:

a locking bar movable between an idle position wherein said locking bar is retracted into said dashboard when said anti-theft device is not in use and an active position wherein said locking bar is partially withdrawn from said dashboard when said anti-theft device is in use;

said locking bar being formed of a telescoping structural member with one end attached within said vehicle dashboard;

a steering wheel lock fixed to the free end of said locking bar structural member and having a hinged portion that opens to receive said steering wheel and locks into the closed position to secure said steering wheel to said locking bar structural member;

said steering wheel lock having an additional locked position whereby said steering wheel lock may be locked into cooperating recesses in said dashboard when said locking bar is in said idle position to prevent withdrawal of said locking bar.

12. The anti-theft device of claim 11 wherein said locking bar is located in proximity to the transmission selector lever of said vehicle when said anti-theft device is in use whereby said locking bar blocks movement of said transmission lever to prevent it from being operated.

13. The anti-theft device of claim 11 wherein said telescoping structural member is rigid when said locking bar is partially withdrawn from said dashboard and the segments of said telescoping member are extended.

14. The anti-theft device of claim 11 wherein said steering wheel lock is secured to the outer circumference of said steering wheel when said anti-theft device is in use.

15. The anti-theft device of claim 11 wherein said steering wheel lock cooperates with recesses formed in said dashboard to lock said locking bar in the retracted position when said anti-theft device is not in use.

16. An anti-theft device for a vehicle having a steering wheel and a dashboard comprising:

a locking bar movable between an idle position wherein said locking bar is retracted into said dashboard when said anti-theft device is not in use and an active position wherein said locking bar is partially withdrawn from said dashboard when said anti-theft device is in use;

said locking bar being formed of a single rigid structural member having a plurality of spaced indentations formed along its length;

a steering wheel receiving fork fixed to the end of said locking bar to secure said steering wheel from movement relative to said locking bar when said receiving fork is in contact with said steering wheel; and a lock mounted on said dashboard and cooperating with said locking bar spaced indentations whereby said locking bar may be selectively locked with said receiving fork in contact with said steering wheel or with said locking bar completely recessed within said dashboard.

17. The anti-theft device of claim 16 wherein said locking bar is located in proximity to the transmission selector lever of said vehicle when said anti-theft device is in use whereby said locking bar blocks movement of said transmission lever to prevent it from being operated.

18. The anti-theft device of claim 16 wherein said steering wheel receiving fork contacts said steering wheel at an intersection of the outer circumference of said steering wheel and a spoke of said steering wheel.

19. The anti-theft device of claim 16 wherein said steering wheel receiving fork serves as a handle to withdraw said locking bar from said dashboard.

20. The anti-theft device of claim 16 wherein said rigid structural member is hollow and said indentations are holes formed in one outer wall of said structural member.

* * * * *